Patented Jan. 30, 1923.

1,443,602

UNITED STATES PATENT OFFICE.

MAX G. WEBER, OF NEWARK, NEW JERSEY, ASSIGNOR TO CHARLES HARDY AND RUPERTI, INC., OF NEW YORK, N. Y., A CORPORATION OF NEW YORK.

PRESERVATIVE COMPOSITION.

No Drawing.  Application filed May 22, 1922.  Serial No. 562,810.

*To all whom it may concern:*

Be it known that I, MAX G. WEBER, a citizen of the United States of America, residing at Newark, in the county of Essex and State of New Jersey, have invented certain new and useful Improvements in Preservative Compositions, of which the following is a full, clear, and exact description.

It is a well known fact that wooden posts or piles partly submerged in either fresh or salt water rapidly deteriorate and decay. It is further well known that such posts or piles either wholly or partially submerged in sea water in certain latitudes are also subject to the ravages of the toredo or other marine borers and very rapidly destroyed. As a protection against such attacks it has been customary to soak or saturate the wood with preservative compositions, for which purpose creosote has usually been employed, or to resort to other and more elaborate defensive means, such as encasing the piles in concrete.

Such measures as have heretofore been adopted for this purpose have not, however, proved wholly effective. In the saturation treatment much difficulty has been experienced in getting the preservative composition to penetrate the wood as thoroughly as necessary, and even creosoted pile have not been found to be wholly immune from the attacks of marine borers, or capable of resisting decay for very long periods.

A serious problem has therefore developed in this art to find some effective means of protecting the wooden posts or piles used in bridge-work, the building of docks and similar purposes against not only too rapid decay, but against the ravages of marine borers, the activities of which in recent times appear to increase rather than diminish, and in my efforts to solve this problem I have discovered a preservative composition which is far more efficacious than any that has heretofore been employed. This discovery forms the basis of my present application for Letters Patent.

As the basic constituent of my new composition I use creosote which for many wall recognized reasons seems to be the best adapted for the purpose. With this substance I combine an oil soluble metallic salt, such as copper resinate or copper stearate or zinc or arsenic oleate. This composition has certain properties as a wood preservative which creosote alone does not possess. It permeates the wood to a greater extent. It is not only extremely distasteful to the marine borers but is positively poisonous to them, and destroys any which attack the wood saturated with it.

The desirability, however, of having a preservative that is infallibly destructive to the borers, has led me to add to the above ingredients oil soluble organic compounds which are specially injurious or destructive of the toredo whether internally taken or brought externally in contact with them. For this purpose I use, preferably, three substances—the di-nitro benzoles, the dinitrochlor benzoles, and para dichlor benzole. These are well known coal tar derivatives used in the manufacture of dye stuffs, and may be used in either their crude or in a refined state, preferably the former.

The complete composition, hence, is one made up of creosote, an oil soluble metallic salt and a plurality of oil soluble organic compounds. The proportions of these may be varied, this being largely dependent upon conditions of use, or wood and other matters with which experts in the art are thoroughly familiar. For general purposes, however, I have found the proportions which yield the best results are by weight—creosote 300 parts; metallic salt 15 to 30 parts, depending largely upon what salt is used, and from 7 to 10 parts of each of the other constituents. This makes the best preservative composition, but the presence of all three of the oil soluble organic compounds is not essential. For example, the dinitrochlor benzole may be omitted without impairing materially the destructive effect.

The posts, piles or other wood to be treated with the above composition are subjected to any of the known processes heretofore used for such purposes. When so treated they will be found not only immune to the attacks of marine borers, but capable of withstanding decay for long periods.

What I claim as my invention is:—

1. A preservative composition for wooden posts, piles and the like consisting of creosote and an oil soluble metallic salt which is destructive of or poisonous to marine insects.

2. A preservative composition for wooden posts, piles and the like consisting of creosote, an oil soluble metallic salt and oil soluble organic compounds destructive of or poisonous to marine borers.

3. A preservative composition for wooden posts, piles and the like consisting of creosote and oil soluble copper resinate.

4. A preservative composition for wooden posts, piles and the like consisting of creosote, oil soluble copper resinate and oil soluble organic compounds which are destructive of or poisonous to marine borers.

5. The composition of matter herein described consisting of creosote, copper resinate, dinitro benzole, dinitro chlor benzole, and para dichlor benzole in the proportions stated.

In testimony whereof I hereto affix my signature.

MAX G. WEBER.